United States Patent [19]

Falcioni

[11] 4,111,580
[45] Sep. 5, 1978

[54] CONTINUOUSLY CURVED FASTENER HEAD AND COUNTERSINK HAVE INTERFERENCE FIT

[75] Inventor: Joseph G. Falcioni, Tacoma, Wash.

[73] Assignee: The Boeing Company, Seattle, Wash.

[21] Appl. No.: 755,834

[22] Filed: Dec. 30, 1976

[51] Int. Cl.² .............................................. F16B 19/04
[52] U.S. Cl. .................................... 85/9 R; 403/388; 403/284
[58] Field of Search .............. 403/404, 388, 284, 282, 403/265-272, 281, 285; 85/1 R, 9 R, 37; 52/223, 230

[56] References Cited

U.S. PATENT DOCUMENTS

| 2,991,858 | 7/1961 | Taylor et al. | 85/37 X |
|---|---|---|---|
| 3,384,395 | 5/1968 | Brandestini | 85/37 X |
| 3,512,446 | 5/1970 | Sekhon | 85/9 R |
| 3,748,948 | 7/1973 | Schmitt | 85/9 R |
| 3,936,205 | 2/1976 | Speakman | 403/388 X |
| 3,951,561 | 4/1976 | Speakman | 403/388 X |
| 4,012,884 | 3/1977 | Pagel | 403/388 X |
| 4,016,703 | 4/1977 | Champoux et al. | 403/404 |

OTHER PUBLICATIONS

The above-cited references all concern bolted joints having stress-corrosion and/or fluid-tight sealing of the fastener heads as a part of their design concepts.

Primary Examiner—Wayne L. Shedd
Attorney, Agent, or Firm—Christensen, O'Connor, Johnson & Kindness

[57] ABSTRACT

A fastening system having a continuously curved countersink section in an aperture through a plurality of workpieces, with a corresponding pin-fastener having a continuously curved head portion substantially congruent to the continuously curved countersink. Pin fasteners and bolts equipped with the continuously curved head surfaces taught herein when mated with a continuously curved countersink provide sufficient resistance to fastener pull through, cause cold working of the workpiece around the countersink, and impose an elastic load upon the workpiece and fastening strengthing the joint.

13 Claims, 9 Drawing Figures

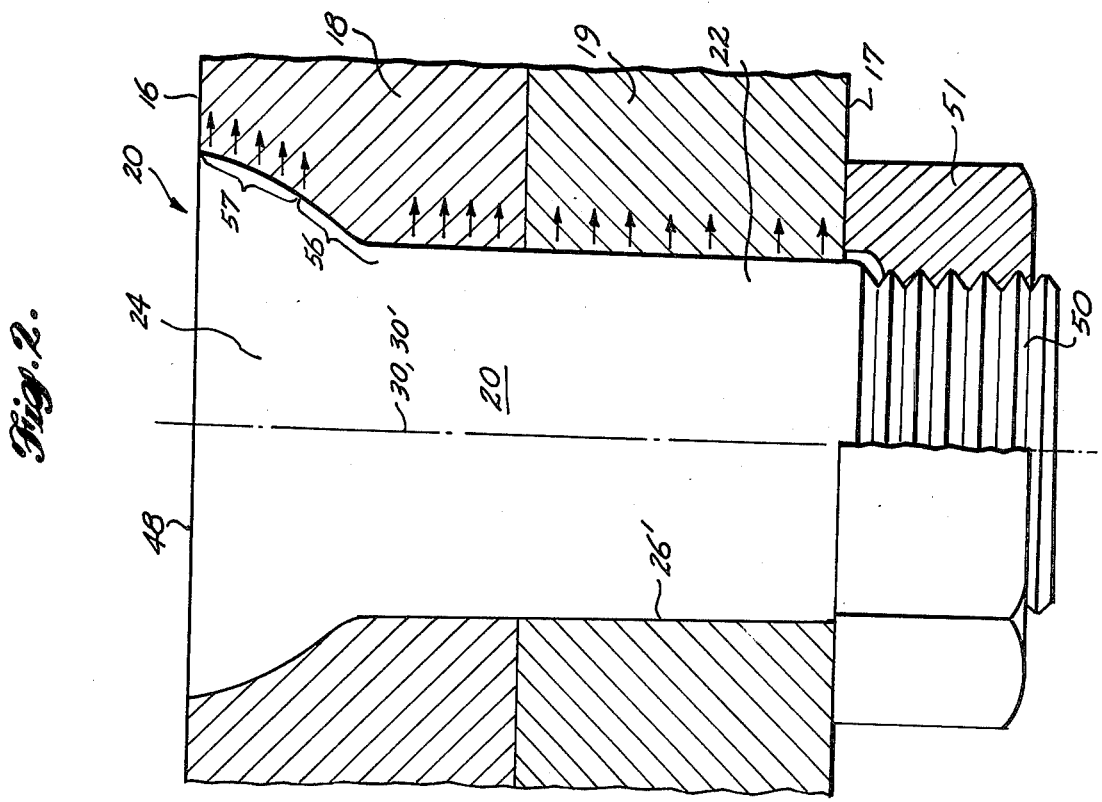
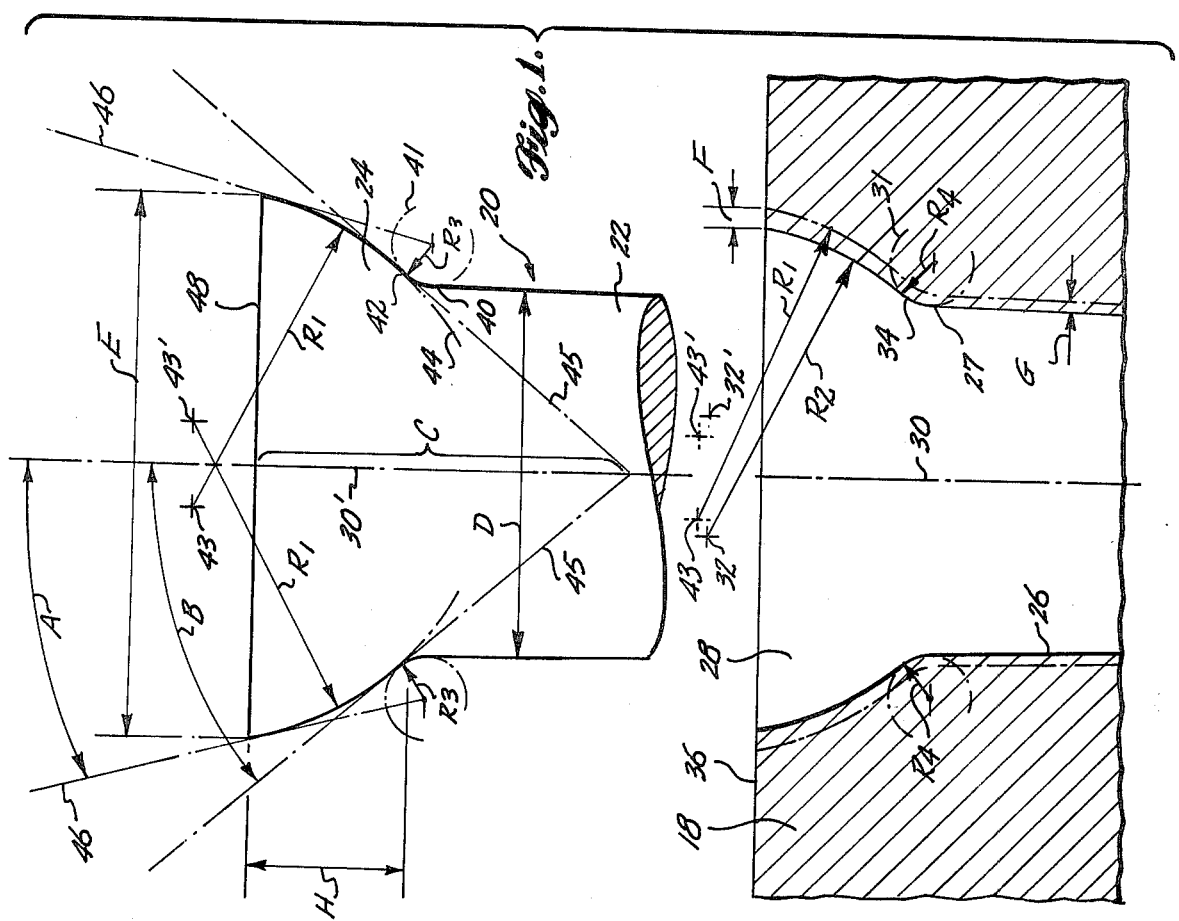

CONTINUOUSLY CURVED FASTENER HEAD AND COUNTERSINK HAVE INTERFERENCE FIT

BACKGROUND OF THE INVENTION

This invention relates to means for fastening workpieces together utilizing fasteners such as threated bolts, lock bolts or bolts with a formable end having continuously curved head portions insertable into bores having substantially congruent continuously curved countersinks.

PRIOR ART

In the fastening of metal work pieces together with rivets, bolts and pinfasteners, the necessity of interference in the countersink area has been demonstrated by extensive testing and experience in the aerospace industry. Countersink structures having diverging angles of 82° and 100° have been found to be associated with numerous fatigue failures, originating in the countersinks. The geometry of these countersink structures is such that the fastener inserted therein cannot impart a sufficient wedging force (interference) to the material at the countersink. As a result, a condition is present that allows infiltration of moisture and foreign materials between the pin or bolt and the countersink. Corrosion results. Efforts have been made to solve the problem of corrosion by the addition of a thick paint coating to isolate the exterior surface of the workpieces from the elements. However, this protection is lost if a break occurs in the paint near the countersink area, allowing infiltration of moisture and foreign materials. Since the typical 82° and 100° fasteners frequently permit working between the material and the pin or bolt, such breaks readily occur. Furthermore, the application of protective paint surfaces adds substantially to the deadweight of an airplane or other structure, resulting in loss of performance and high fuel consumption. In the instance of an aircraft, the structures which utilize bolts and pin-fasteners are constantly under the cyclic influence of temperature, atmosphere pressure, dynamic stresses and moisture. As a result, a crack in the paint can initiate a corrosion nucleus. From the initiation of this nucleus and upon continued cyclic influences as mentioned, corrosion which may be visually concealed can spread to large areas, both at the interface of the paint and the fasteners and to countersink boundary. Catastrophic failure due to stress corrosion may occur.

The wedgehead pin fastener and countersink, such as is shown in U.S. Pat. No. 4,016,703 has been shown to have superior corrosion resistance as well as demonstrated improvements in the strength of the joint due to cold working of the metal surrounding the countersink. The wedgehead countersink and fastener is formed by the blending of two truncated cones and by having the corresponding diameters of the pin-fastener structure be larger than the diameters of the countersink, whereby an interference fit results when the pin-fastener is installed. Manufacture of the structures having two truncated cones have proven to be a high cost factor. These excessive costs have been found to be the result of the grinding and machine tool life needed to produce the structure. In addition, corners of the die and workpiece are difficult to fill. Accordingly, there is a need for a pin-fastener or bolt structure and related countersink configuration which exhibits the superior structural integrity and corrosion resistance of the wedgehead pin-fasteners, yet does not suffer from the high manufacturing costs encountered in the manufacture of such wedgehead pin structures.

OBJECTS OF THE INVENTION

It is one object of this invention to provide a continuously curved countersink structure and a continuously curved pin-fastener head structure which obtains a sufficient working of the material surrounding the countersink to obtain structural integrity, yet provides resistance to pull-through of the pin-fastener when installed.

It is a further object of this invention to provide a fastener system which achieves a selectively controlled interference fit with all or part of the areas of a countersink and bore in the fastening system.

It is a further object of this invention to provide a fastening system having superior corrosion resistance.

It is a still further object of this invention to provide a fastening system comprising workpieces and a pin-fastener or bolt which prevents stress corrosion in the assembled structure by achieving a controlled laminar interference pattern in the material surrounding the countersink.

It is a specific object of this invention to provide a continuously curved countersink and a corresponding, substantially congruent, fastener structure which is inexpensive to manufacture and which obtains superior corrosion resistance and fatigue life in the assembled parts.

SUMMARY OF THE INVENTION

A fastening system is disclosed comprising a workpiece having an aperture therethrough including a countersink having a continuous curve from the bore to the surface and a corresponding pin-fastener or bolt having a head structure which is continuously curved from the shank to the end of the head. The countersink is defined by a surface of revolution, the generatrix of which comprises a continuously curved line extending from the bore of the workpiece, defining a continuous curve from the interior of the work-piece to the surface thereof. One preferred form of the countersink may be defined by rotation of a line comprising arcs of two circles about a line substantially coincident with the axis of the bore, the first arc being tangent to the bore through the workpiece and positioned interiorly of the edge thereof, and the second circle being tangent to the first circle and intersecting the edge of the workpiece. Other embodiments of this invention may be formed by having the line about which the generatrix is rotated being angled from or skewed with respect to the axis of the bore, so long as a continuous, smooth curve is attained from the bore to the surface. Sections of parabolas, ellipses and other smooth curves may be used without deviating from the applicant's invention. A corresponding smooth curved structure is formed on the heads of the pin-fasteners or bolts utilized in conjunction with the continuous countersink. A portion of the countersink near the bore which is flared outwardly from the axis of the bore provides resistance to pull-through of the pin-fastener or bolt. The portion of the countersink near the surface of the work-piece is contoured more nearly parallel to the axis thereof so that the interference fit necessary to induce hoop stresses and improve stress corrosion resistance, as well as to obtain the desired seal. Both elastic load on the workpiece and fastener and controlled laminar interference pattern in the cold worked work-piece material is obtainable in a properly-designed fastener -- work-piece system.

These and other aspects of this invention will be more readily apparent upon an examination of the description which follows and the appended drawings referred to therein.

BRIEF DESCRIPTION OF THE DRAWINGS

FIG. 1 shows a partial side elevation of a fastener having the head structure taught by this invention shown therein, positioned above and in exploded view with respect to an aperture in a work-piece comprising a continuously curved countersink.

FIG. 2 shows an assembled joint structure using the continuously curved countersink in conjunction with a bolt having acontinuously curved head structure.

DETAILED DESCRIPTION OF THE PREFERRED EMBODIMENTS

Figure 3:
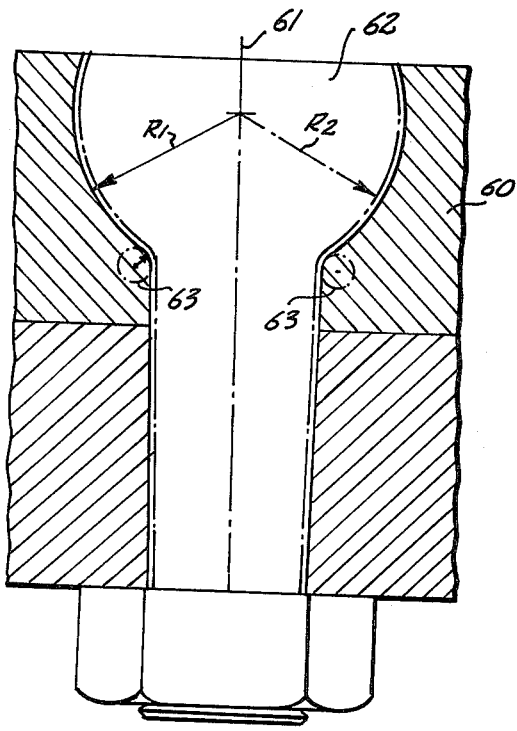
FIG. 3 shows a joint structure wherein a bolt and countersink are shown formed at surfaces defined by a generatrix comprising segments of two circles, the upper circle having its center positioned below the work-piece surface.

Referring specifically to FIG. 1 there is shown in an exploded view a fastener having a head structure particularly adapted to be inserted within a continuously curved countersink formed in a workpiece and a workpiece so fashioned with a continuously curved countersink. The fastener 20 is comprised of a shank portion 22 and an enlarged head portion 24. Shank 22 may either be straight or tapered with respect to the longitudinal axis thereof. A interference fit is preferrably formed along the length of bore portion 26 of the workpiece 18. In the preferred embodiment shown in FIGS. 1 and 2 the countersink 28 is a surface described by the rotation of a curved generatrix about the axis 30. In FIG. 1 the generatrix for the countersink 28 is formed of segments of two circles, the first circle 31 being a small diameter circle positioned at the base of countersink 28 having a radius $R_4$. Circle 31 is located within the workpiece 18 and is positioned tangent to bore 26 at point 27. The second segment of the generatrix is formed of a second circle having a radius $R_2$ measured from center 32 and which is tangent to circle 31 at point 34. The countersink surface is defined by rotation of the abovedescribed generatrix about axis 30. The resultant countersink 28 is a smooth, curved surface extending from the bore 26 to the surface 26 of the workpiece 18.

The exterior surface of the head of fastener 20 is formed in a shape substantially congruent to the abovedescribed countersink shape. The shape is defined by a rotation of the generatrix formed of two circular segments, the first circle 41 having a radius $R_3$. Circle 41 is tangent to shank 22 at tangency point 40. The circle 41 also has a point of tangency at 42 to a second, larger diameter circle 44 having a radius $R_1$. The fastener head is described by the locus of points generated by rotation of the above-described generatrix about axis 30'. Circle 44 is drawn about center 43 shown off-set to one side of axis 30'. A line 45 drawn tangent to the point of tangency between circle 44 and circle 41 lies at an angle of approximately 41° with respect to the axis 30'. The line 46 drawn tangent to circle 44 at the intersection of circle 44 with fastener-end 48 lies at an angle of approximately 15° with respect to axis 30'.

The radii $R_1$ and $R_2$ and the location of centers 32, 43, 32' and 43' are chosen so that an interference fit of from about 0.004 to 0.015 inches and preferably from about 0.008 to 0.012 inches is obtained at the surface 36 of workpiece 18 when the fastener 20 is fully installed within workpiece 18. Similarly, the radii and center locations of circles 31 and 41 are chosen so that an interference fit of from 0 to 0.010 inches and preferably from 0.004 to 0.008 occurs between shank 22 and bore 26 when the fastener is fully inserted into workpiece 18.

For the preferred embodiment shown in FIG. 1, the dimensions which have been found workable by the inventor are set forth in Table I along with the dimensions which are preferred.

TABLE I

| Symbol | Workable Range | | Preferred Range - Inches | | Most Preferred Range - Inches | | |
|---|---|---|---|---|---|---|---|
| | Min. | Max. | Min. | Max. | | | |
| D | D | | 0.2 | 0.5 | 0.25 | 0.312 | 0.375 |
| FASTENER NUMBER | — | | 6 | 16 | 8 | 10 | 12 |
| $R_1$ | 0.3D | 2.0D | 0.1 | 1.0 | .20 | 0.25 | 0.30 |
| $R_2$ | 0.3D | 2.0D | 0.1 | 1.0 | .20 | .25 | 0.30 |
| $R_3$ | 0.05D | 0.2D | 0.01 | 0.1 | .024 | 0.03 | 0.036 |
| $R_4$ | 0.05D | 0.2D | 0.01 | 0.1 | .024 | 0.30 0.036 | |
| $H_1$ | 0.2D | 1.0D | 0.05 | 0.2 | .105 | 0.13 | 0.155 |
| C | 0.5D | 2.0D | 0.10 | 0.8 | .25 | 0.31 | 0.37 |
| E | 1.3D | 3.0D | 0.3 | 0.6 | 0.34 | 0.42 | 0.50 |
| F | 0 | 0.1D | 0.001 | 0.016 | 0.008— 0.012 | 0.008— 0.012 | 0.008— 0.012 |
| G | 0 | 0.1D | 0.001 | 0.012 | 0.004— 0.008 | 0.004— 0.008 | 0.004— 0.008 |
| H | 0.2D | 1.0D | 0.05 | 0.2 | 0.1 | 0.13 | 0.15 |
| ANGLE A | −5° | 30° | 0° | 25° | 15° +5 | 15° +5 | 15° +5 |
| ANGLE B | 30° | 60° | 35° | 50° | 41° +5 | 41° +5 | 41° +5 |

The dimensions set forth in Table I are for illustrative purposes only and present the inventor's best present contemplation of the workable dimensions for his invention. In all cases, the dimensions set forth are to be chosen so that a continuously curved countersink is obtained for the shape of the countersink and a continuously curved fastener head complementing the shape of the countersink is obtained for the fastener so that a closely interfitting structure results in which foreign matter cannot enter and in which residual stresses are preferably set up within the workpiece and cold working of the workpiece preferrably obtained.

In FIG. 2 a complete structural joint is shown joining workpieces 18 and 19 together by means of a bolt-type fastener 20. Bolt 20 has a threaded end 50 with a nut 51 shown drawn down tight against surface 17 of workpiece 19. Head 24 of bolt 20 is shown drawn into workpiece 18 so that surface 48 is flush with surface 16. In this embodiment the pin 20 and the bore are coaxial on axes 30 – 30'. Forcible insertion of the bolt 20 causes a certain amount of the material of workpiece 18 is to be displaced in a direction perpendicular to axes 30 – 30' as shown by the small arrows. This interference, preferably in the form of a controlled laminar interference pattern, causes residual stresses to be set up and may cold work the workpiece material adjacent the bore providing a very substantial strengthening to the workpiece structure.

The pin fastener as shown in FIG. 2, having a smooth exterior surface in the form of a continuous curved head as shown, is conveniently drawn into the countersink until the zone 56 resists further entrance of the pin 20 into workpieces 18 and 19. Zone 56 being an outwardly flared portion of head 24 provides sufficient resistance to pull-through of the bolt 20 and is located so that surfaces 48 and 16 are shown substantially coplanar. The portion of the head shown approximately at zone 57 is contoured so that the portion adjacent surface 48 approaches perpendicularity with respect to surface 48. Drawing pin 20 into workpiece 18 causes radial displacement of the material adjacent zone 57. Hoop stresses are set up surrounding the countersink and the resulting structure is substantially strengthened thereby.

Figure 4:
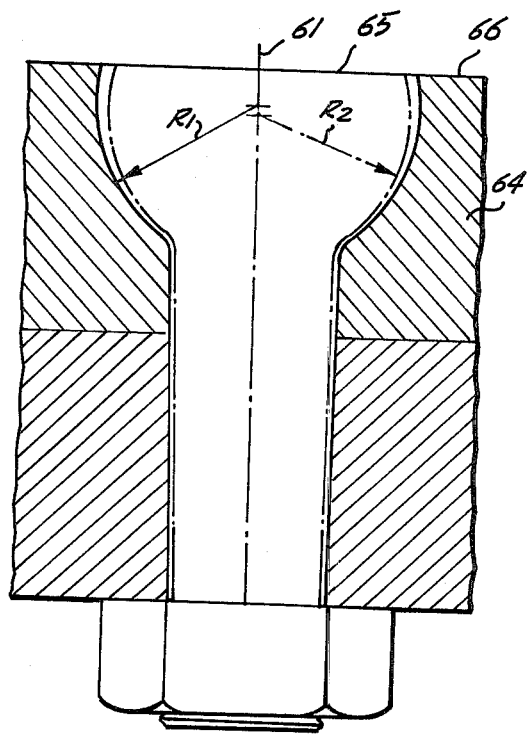
FIG. 4 shows a device similar to that shown in FIG. 3 wherein the center of the upper circle forming the generatrix for the countersink is positioned below the center of the upper circle forming the generatrix for the bolt.
Figure 5:
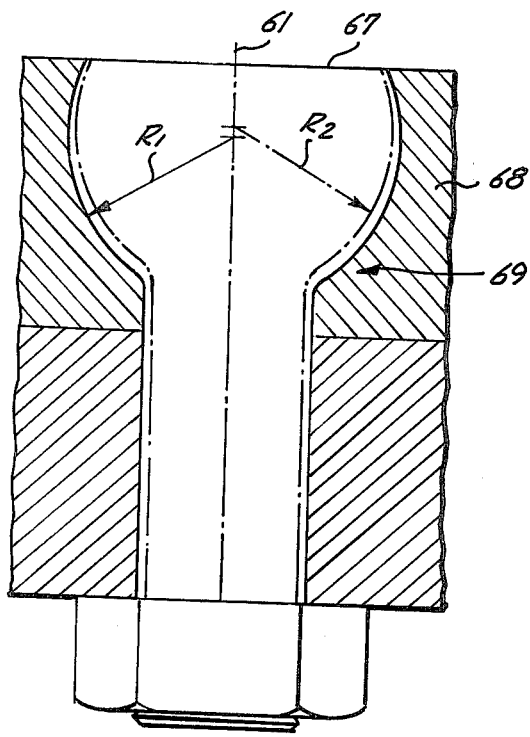
FIG. 5 shows a cross section of a structural joint wherein the center of the upper circular portion of the generatrix for the countersink is positioned above the center of the upper circular portion of the generatrix for the bolt, both centers being located below the surface of the work-piece.

In FIGS. 3, 4 and 5 a "captured" type of fastener and countersink is shown. In these figures, the symbol $R_1$ is used to denote the radius of the upper portion of the generatrix describing the fastener head while $R_2$ is utiized to denote the radius of the upper portion of the countersink. The fastener in each of FIGS. 3, 4 and 5 is shown captured within the workpiece and the center of the upper arc of the generatrix in each instance is shown positioned at various locations on the axis 61. A smaller circle 63 is shown forming the portion of the generatrix tangent 10 the shank of the fastener. In FIG. 3 the centers are shown coincident. As a result, the interference between pin 62 and workpiece 60 will be substantially equivalent over the entire surface of the head of fastener 62. In FIG. 4 the center of the circle forming the upper portion of the generatrix of the pin 65 is positioned above the center of the circle forming the upper portion of the generatrix of the countersink. In this embodiment, substantially greater amount of interference fit between the pin 65 and workpiece 64 will occur adjacent the surface 66 of workpiece 64. In FIG. 5, the center of the arc forming the upper portion of the generatrix of pin 67 is positioned below the center of the arc forming the upper portion of the generatrix of the countersink. In this embodiment, a greater amount of interference between workpiece 68 and pin 67 will occur near the bottom 69 of the countersink surface. In each of FIGS. 3 and 4 the pin fastener is shown having a substantial taper along its length so that an interference fit may be conveniently formed along the entire length of the bore through workpieces 60 and 60'. Alternately both fastener and bore may be cylindrical as shown in FIG. 5.

Figure 6:
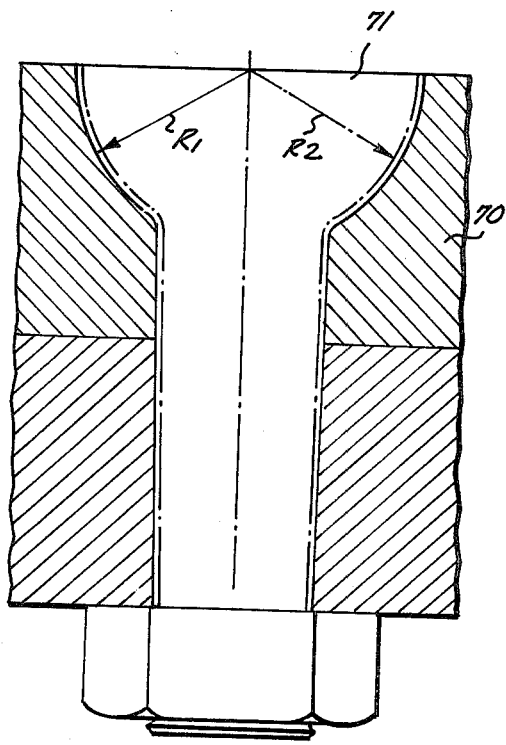
FIG. 6 shows a cross section of a structural joint having the centers of the upper portions of the generatrices positioned at the surface of the workpiece.

In FIG. 6 the centers of circles utilized to form the upper portion of the generatrices of both the countersink and the pin head are coincident at the upper surface of the pin head. In this embodiment, equivalent interference will be encountered between the pin head 71 and workpiece 70 along the entire surface of the countersink.

Figure 7:
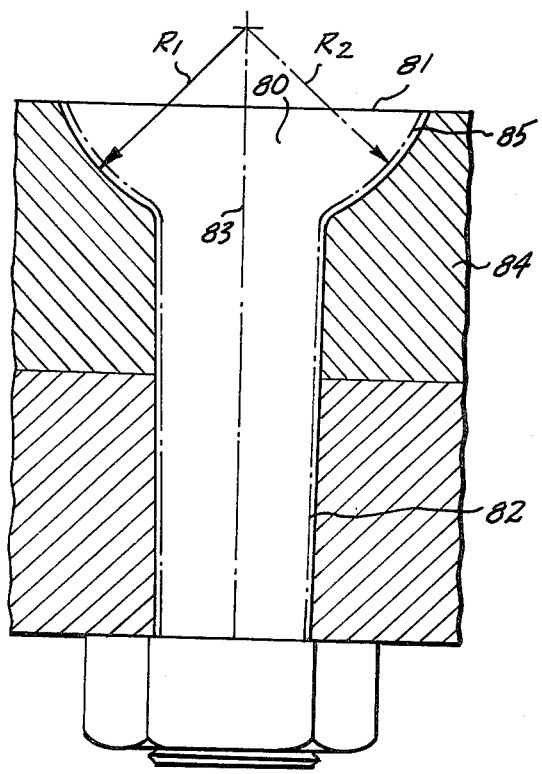
FIG. 7 shows a cross section of a structural joint wherein the upper portions of the generatrices of each surface are circles having their centers positioned above the plane of the surface of the workpiece.

FIG. 7 shows an embodiment of this invention in which the arcs used as a portion of the generatrices for the fastener head 80 and countersink 85 are coincident and positioned upon the axis 83 of both fastener 80 and bore 82 but at a location above the surface 81 of fastener 80. This configuration provides a fastener 80 and workpiece 84 structure in which the pull-through resistance of the fastener head 80 is substantially enhanced.

Figure 8:
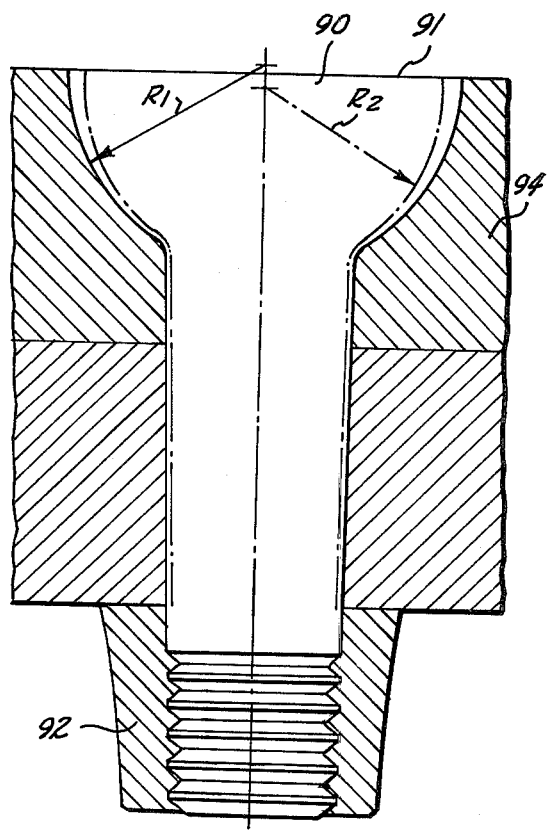
FIG. 8 shows a cross-sectional view of a structural joint wherein the upper portion of the generatrix of the countersink comprises a circle having its center below the surface of the workpiece and the upper portion of the generatrix for the pin fastener comprises a circle having its center above the center of the workpiece, a pin fastener with a swaged collar being shown in place of the bolts shown in other figures.

In FIG. 8 circular segments are again utilized as the generatrices for the countersink surface and the pin fastener head surface, the center of the circle used for a part of the countersink generatrix being positioned below the surface of the workpiece 94 while the center of the circle used as a part of the generatrix for the pin fastener is above the surface 91 of pin 90. This configuration results in a fastener workpiece structure in which substantially greater stresses are set up adjacent the surface of the workpiece with diminishing stresses as one travels toward the center of the workpiece axially along the structural joint. A swaged collar type of fastener is shown with fastener 90 held in place by collar 92.

Figure 9:
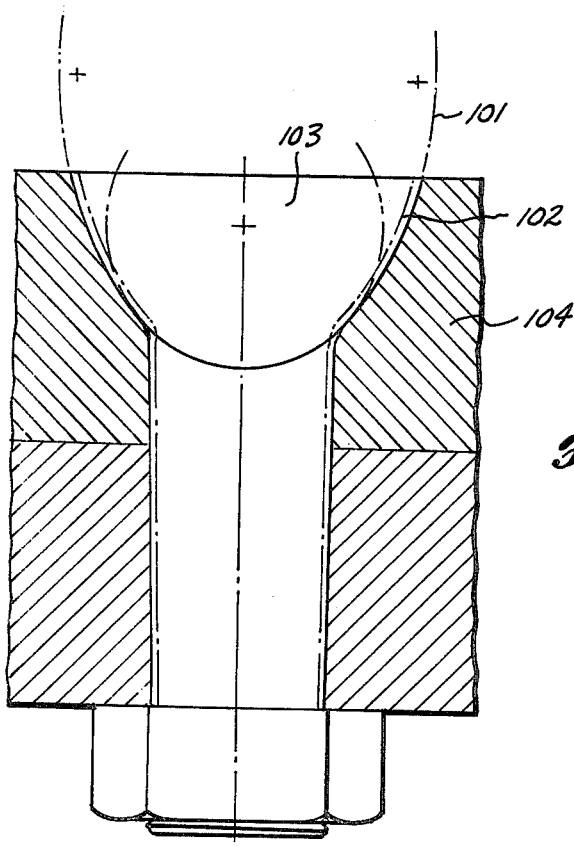
FIG. 9 shows a cross-sectional view of a structural joint wherein the generatrices of the pin-fastener head and the countersink are sections of ellipses.

Other surfaces of rotation may be utilized to define the surfaces of the countersink and pin fastener. For example, in FIG. 9 portions of an ellipse 101 were utilized as parts of the generatrices to define surfaces of the countersink 102 and pin 103. Clearly, hyperbolic sections and other smooth, curved segments may be used as generatrices for the fastener head and countersink, the prime requirement being that a smooth, curved surface is generated from the shank of the pin to the top of the fastener head and from the bore to the surface of the workpiece.

Other configurations of this invention include fasteners and countersinks having the surfaces defined by rotation of curved lines about axes non-coincident with the axis of fastener pin and countersink.

I claim:

1. A fastening system for joining workpieces with a fastener comprising:

a workpiece formed prior to joining having an aperture therethrough, said aperture having a countersink adjacent one surface of said workpiece, said countersink comprising a continuously curved surface from the bore of said aperture to said one surface, the portion of said continuously curved surface adjacent said bore diverging from said bore and providing resistance to pull through of said fastener, and the portion of said continuously curved surface adjacent said one surface having decreasing divergency with said bore and providing a surface adapted to an interference fit with said fastener;

a fastener formed prior to joining having a head shaped to be substantially congruent to said countersink and aperture, but exceeding the dimensions thereof slightly, whereby forcible insertion of said fastener in said aperture provides a structural fluid tight joint.

2. The fastener of claim 1 wherein said countersink and said head are surfaces of revolution.

3. The fastener system of claim 2 wherein said surface of revolution forming said countersink is generated by rotation of a generatrix comprising a continuously curved line about an axis coincident with the axis of said aperture.

4. The fastener of claim 3 wherein said generatrix is formed by first and second circular segments, said first segment having its center outside said bore and being tangent to said bore and said second segment having a larger diameter than said first segment and having its center disposed relatively inwardly from said countersink surface, said second segment being disposed tangent to said first segment and intersecting said one surface.

5. The fastener system of claim 4 wherein said first segment has a radius in the range of 0.05 to 0.2 times the diameter of said bore.

6. The fastener system of claim 4 wherein said second circle has a diameter in the range of 0.3 to 2.0 times the diameter of said bore.

7. The fastener system of claim 1 wherein said fastener has a shank adapted to be inserted into said bore and wherein said head of said fastener has a terminal surface and a continuous curve from said shank to said terminal surface.

8. The fastener system of claim 7 wherein said continuous curve diverges outwardly in a smooth curve adjacent said shank to form a surface providing resistance to pull through of said fastener head in said countersink, then extending toward said terminal surface in decreasing divergency so that a tangent drawn thereto at said one surface approaches an orientation parallel to the axis of said fastener.

9. The fastener system of claim 8, wherein said head constitutes a surface of revolution obtained by rotation of a generatrix comprising a curved line tangent at one end to said shank about an axis substantially coincident with the axis of said fastener.

10. The fastener system of claim 9, wherein said generatrix comprises first and second circular segments.

11. The fastener system of claim 10, wherein said first circular segment is tangent to said shank and is in the range of 0.05 to 0.2 times the diameter of said shank.

12. The fastener system of claim 10, wherein said second circular segment has its center positioned inwardly axially of said head and is in the range of 0.3 to 2.0 times the diameter of said shank.

13. A fastening system for joining workpieces with a fastener comprising:

a workpiece, formed prior to joining, having an aperture therethrough, said aperture having a countersink adjacent one surface thereof, said countersink comprising a continuously curved surface from the bore of said aperture to said one surface, the portion of said continuously curved surface adjacent said bore diverging from said bore and providing resistance to pull through of said fastener, and the portion of said continuously curved surface adjacent said one surface having decreasing divergency with said bore and providing a surface adapted to an interference fit with said fastener; and a fastener, formed prior to joining, having a head and a shank, said head having a terminal surface and a continuous curve from said shank to said terminal surface which is substantially congruent to said countersink and aperture, but exceeding the dimensions thereof slightly, whereby forcible insertion of said fastener in said aperture provides a structural, fluid tight joint.

* * * * *

UNITED STATES PATENT AND TRADEMARK OFFICE
CERTIFICATE OF CORRECTION

PATENT NO. : 4,111,580

DATED : September 5, 1978

INVENTOR(S) : Joseph G. Falcioni

It is certified that error appears in the above-identified patent and that said Letters Patent are hereby corrected as shown below:

Column 4, Table I: the lines reading

"$R_4$ 0.05D 0.2D 0.01 0.1 .024 0.30 0.036" should read

—$R_4$ 0.05D 0.2D 0.01 0.1 .024 0.36 0.036—.

Column 5, line 13: delete "is".

Column 6, line 65: after "structural", insert a comma —,—.

Signed and Sealed this

Seventeenth Day of July 1979

[SEAL]

Attest:

*Attesting Officer*

LUTRELLE F. PARKER
*Acting Commissioner of Patents and Trademarks*